July 7, 1925.

B. D. BALDWIN ET AL 1,545,117

TRUCK OR WHEELED RECEPTACLE

Filed Oct. 1, 1921

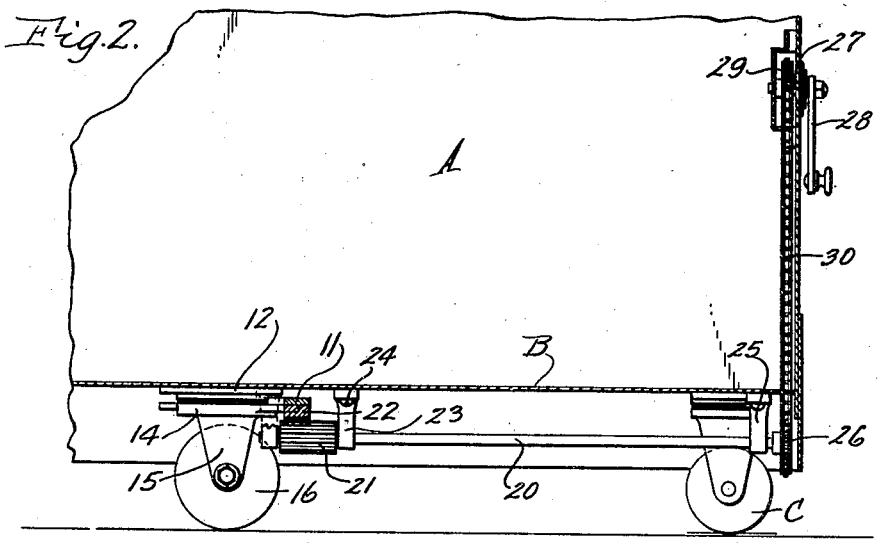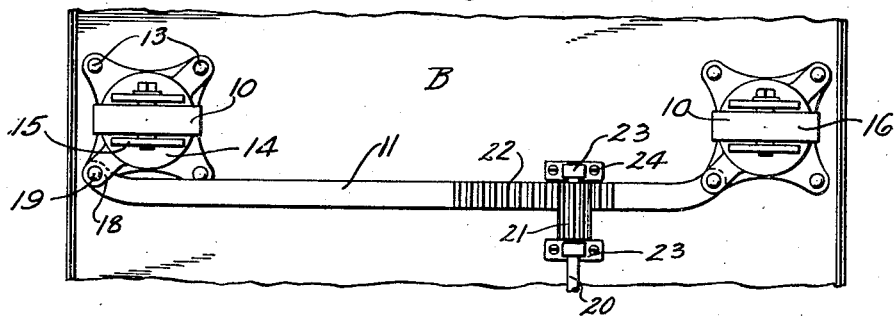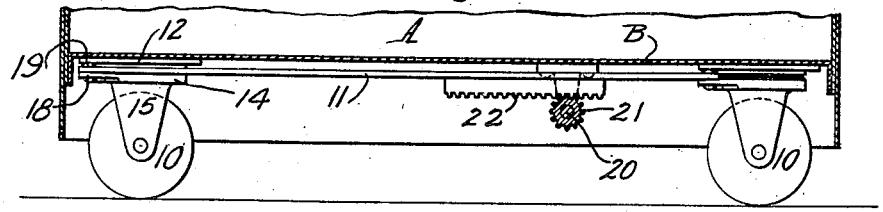

Patented July 7, 1925.

1,545,117

UNITED STATES PATENT OFFICE.

BURT D. BALDWIN AND CLAYTON L. SAMPLE, OF JAMESTOWN, NEW YORK, ASSIGNORS TO ART METAL CONSTRUCTION COMPANY, OF JAMESTOWN, NEW YORK.

TRUCK OR WHEELED RECEPTACLE.

Application filed October 1, 1921. Serial No. 504,698.

*To all whom it may concern:*

Be it known that we, BURT D. BALDWIN and CLAYTON L. SAMPLE, citizens of the United States, residing at Jamestown, in the county of Chautauqua and State of New York, have invented a new and useful Improvement in Trucks or Wheeled Receptacles, of which the following is a specification.

This invention relates to caster or roller controlling and adjusting devices for hand trucks or the like, and is particularly adapted for use with buses or roller baskets such as are commonly used in libraries, stores, etc.

In stores, libraries and other places having relatively narrow aisles or spaces in which trucks or buses of the type set forth are propelled, considerable difficulty is experienced in moving the trucks or buses from one aisleway to another or in turning corners, due to the limitation of space in the aisles. It often happens that the space in which to operate is so limited that it is practically impossible to turn the body of the truck or bus so as to make the necessary turn, for example at a right angle turn. It is also customary when trucks or buses of the type referred to are not being used to carry articles from one place to another, to shove the trucks under a table or counter and as a rule when the trucks are pulled from beneath the table or counter, owing to the positions of the casters, they move sideways often coming into more or less violent contact with the table or counter legs or with other articles and thereby damaging the same. This damage is aggravated in certain places, such, for example, as libraries where the tables are ofttimes of finely finished material and the trucks are loaded with books or other relatively heavy articles.

The objects of this invention are to provide a truck or the like having a caster controlling and adjusting device which enables the casters to be quickly, easily and positively positioned so that the truck may be moved in the desired direction without sidewise movement and without turning the body of the truck; also to provide a caster controlling and adjusting device which effectively maintains the casters in positions to guide the truck or the like in movement in a desired direction; also to provide caster controlling and adjusting mechanism of relatively simple and inexpensive construction and which will not be liable to get out of order; also to improve such mechanism in the other respects hereinafter set forth and claimed.

In the accompanying drawings:

Fig. 2 is a vertical sectional elevation of a portion thereof on line 2—2, Fig. 1.

Fig. 3 is a partial bottom plan view thereof showing the casters positioned to direct the device in another direction.

Fig. 4 is a section thereof on line 4—4, Fig. 1, the guiding rollers being turned to a different position.

Figure 1:
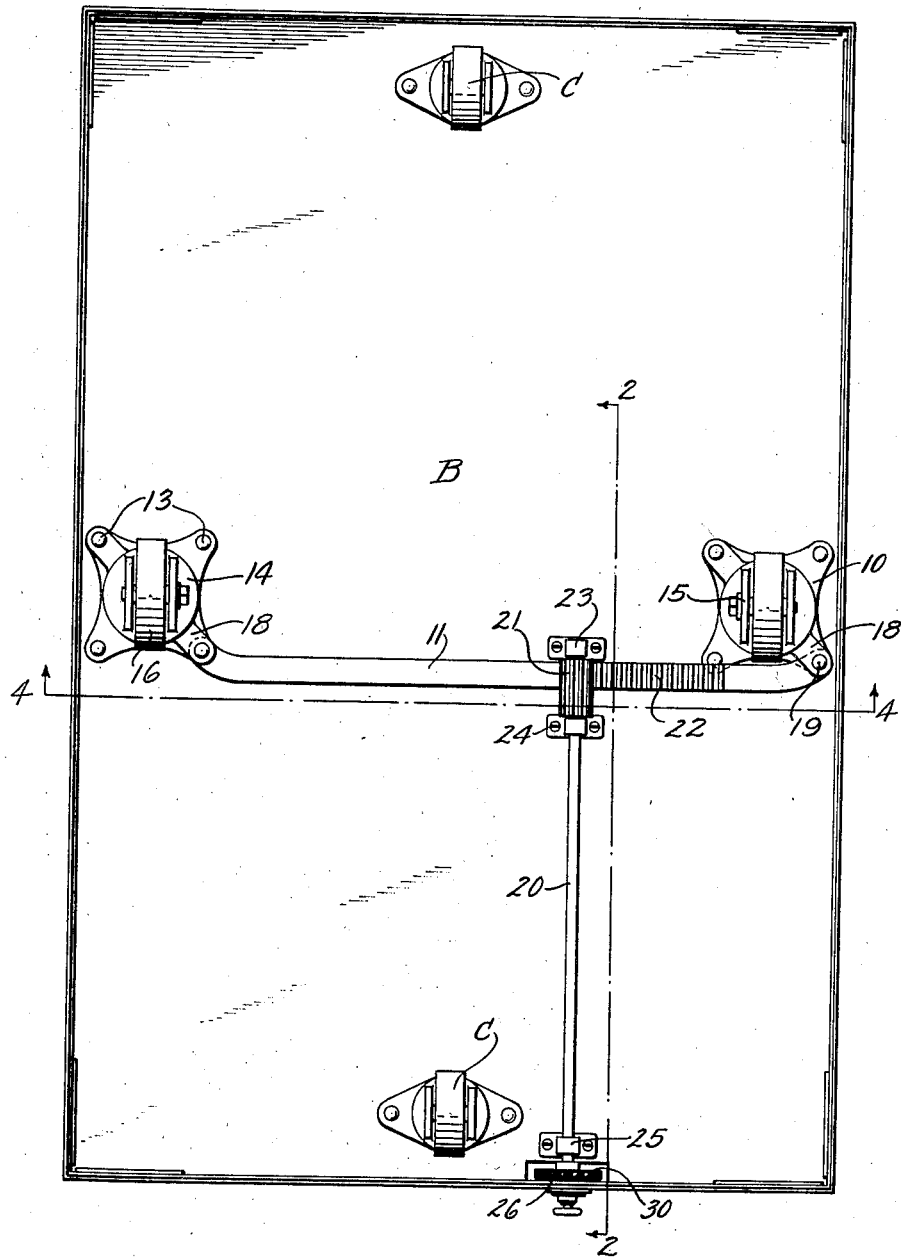
Fig. 1 is a bottom plan view of a truck embodying the invention showing the casters positioned to guide the device in one direction.

The invention is shown as applied to a truck, bus or the like such as are commonly used in libraries for collecting and carrying books. It is to be understood, however, that the invention is applicable to wheeled or roller buses, trucks, floor baskets or the like having bodies or supporting platforms of different forms or character adapted for various different uses.

The invention, generally stated, includes the provision of one or more pivotally adjustable wheels, casters or rollers which act to support and guide the truck, together with means located at an outside wall of the truck, or other accessible position, for changing the adjustment of the guide roller or rollers, so that the truck may be guided in a desired direction.

In the embodiment of the invention illustrated, A designates a truck or bus body having a bottom or platform B. C designates a pair of supporting casters connected to the bottom of the bus near opposite ends thereof. These casters may be of any known or suitable type, those illustrated being swivel ball bearing casters such as commonly used in such structures. In the preferred form of the invention illustrated, two supporting and guiding casters 10 are provided preferably midway between the end casters C. These casters 10 are pivotally mounted beneath the bus body and are connected by a link or arm 11 so that the casters can be turned simultaneously to any one of their several guiding positions. The link 11 may be attached in any suitable manner to the casters. In the construction illustrated, each of the casters 10 comprises an upper ball race portion 12 which is riveted or otherwise secured to bottom B of the bus as at 13 and a lower ball race portion 14 which carries journal lugs 15 between which the roller 16 is rotatably mounted, anti-friction balls being interposed between the two ball race portions. The lower ball race portion 14 is provided with an ear 18 to which the adjacent end of the link 11 is pivoted as at 19.

As shown in Fig. 2 of the drawings, it is preferred that the rollers of supporting and guiding casters 10 be of greater diameter than the rollers of end casters C, or extend slightly below the end casters, so that the major portion of the weight of the truck and its contents is supported by the casters 10. This ensures that the positions of the casters 10 will determine the direction in which the truck moves when it is propelled, owing to the relatively great weight upon them, the end casters being relatively free to adjust themselves to follow the guiding casters.

The preferred means for adjusting the casters to their different positions includes a rock shaft 20 which extends from the link 11 to a side or end of the bus body and has fixed thereon a pinion 21 which meshes with a toothed rack 22 on the link 11, whereby when the rock shaft is turned the link 11 will be moved and turn the casters 10. The rock shaft may be supported beneath the bottom of the bus in any suitable manner, as for example, by bearings 23 disposed at opposite ends of the pinion 21 and attached to the bottom of the bus by screws or the like 24, and a bearing 25 positioned adjacent the side of the bus, and through which the outer end of the rock shaft extends. When the link 11 is thus moved endwise to turn the casters, it also has a limited lateral movement in the direction of the rock shaft 20 owing to the arcs in which the pivotal connections between the link and the casters swing. The pinion 21 is made long enough to accommodate this lateral movement of the bar and always remain in mesh with the rack 22. The link 11 is adapted to strike the bearing 23 at the inner side of the bar, which thus serves as a stop to prevent the casters from being turned more than ninety degrees or beyond positions at right angles to each other.

Any suitable means may be employed for turning the rock shaft 20. Preferably means are provided for actuating the rock shaft 20 from a convenient point on the side of the bus a distance above its bottom. The means shown for this purpose comprise a sprocket wheel 26 secured to the outer end of rock shaft 20 and a crank shaft 27 which is journaled in the side of the bus body. The crank shaft 27 is provided with a crank handle 28 for turning it and a sprocket wheel 29 connected by an endless sprocket chain 30 to the sprocket wheel 26.

It will be seen from the construction illustrated that when the crank shaft 27 has been turned in one direction by actuation of the handle 28, the casters will be positioned to guide the truck in the direction of its length, as illustrated in Fig. 1, and that when the shaft has been turned in the other direction, the casters will be placed in a position to guide the truck in a direction transversely of its length, as shown in Fig. 3. The provision of these adjustable guiding casters makes it possible to effectively control the direction of the travel of the truck and prevents the truck from moving sidewise when it is pulled forward, and also enables the truck to be readily moved in directions at right angles to each other without requiring space in which to turn the body of the truck. The provision of the operating handle in the side of the truck a distance above the bottom renders it easy of access and operation by the operator.

We claim as our invention:

1. In a truck or the like, the combination of a pair of supporting wheels therefor pivoted on the truck to swing to different positions for guiding the truck in different directions, a link connecting said wheels for swinging the wheels simultaneously about their pivots, said link having a toothed rack, a pinion meshing with said toothed rack for moving said link endwise to swing the wheels, said link also having a lateral movement, an operating shaft for said pinion extending across said link, bearings for said shaft at opposite sides of said link and adapted to be engaged by said link to limit the lateral movement of the link, and means for turning said shaft.

2. In a truck or the like, the combination of a plurality of pivoted casters on which said truck rests, a link connector between a pair of casters whereby said pair of casters may be simultaneously turned on their pivots, a rack on said link connector, an actuating member from one side of said truck to said link connector, a part on said actuating member engaging said rack for moving said link connector when said actuating member is actuated, bearings for said actuating member, and parts on said bearings providing stops for limiting movement of said link connector.

BURT D. BALDWIN.
CLAYTON L. SAMPLE.